July 29, 1969 P. W. DWYER 3,458,011
LUBRICATION-SUPPLY SYSTEM UTILIZING BLOW-BY GASES TO MAINTAIN A GENERALLY CONSTANT OIL LEVEL
Filed Dec. 22, 1967
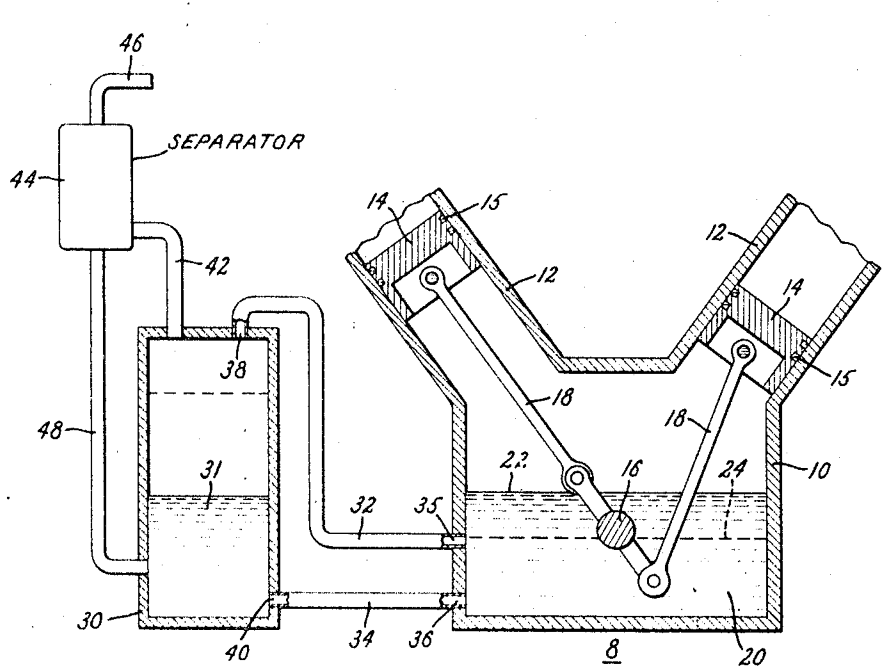
INVENTOR:
PETER W. DWYER,
BY William Freedman
ATTORNEY United States Patent Office | 3,458,011
Patented July 29, 1969

3,458,011

LUBRICATION-SUPPLY SYSTEM UTILIZING BLOW-BY GASES TO MAINTAIN A GENERALLY CONSTANT OIL LEVEL

Peter W. Dwyer, Paoli, Pa., assignor to General Electric Company, a corporation of New York Filed Dec. 22, 1967, Ser. No. 692,953
Int. Cl. F01m *11/12*
U.S. Cl. 184—103 5 Claims

ABSTRACT OF THE DISCLOSURE

A lubrication-supply system for a machine comprising an oil-containing sump into which blow-by gases pass during machine-operation. An oil-containing auxiliary reservoir is connected to the sump through a pair of conduits respectively terminating at the sump in a first port and a second port located therebeneath. During machine operation, blow-by gases develop a positive pressure in the sump that is utilized to maintain a generally constant oil level in the sump at the location of said first port.

This invention relates to a lubrication-supply system for a machine that comprises a lubrication sump into which blow-by gases pass. An example of such a machine is a reciprocating-piston type machine, such as an air compressor or an internal combustion engine. More particularly, the invention relates to a lubrication supply system which maintains a substantially constant oil level in the sump, or crankcase, of the machine during its operation.

It is sometimes required that this type machine be capable of operating for very long periods, e.g., one year or more, without requiring the addition of lubricating oil. This is a particularly difficult requirement to meet for machines in which there is only a short distance between the full and low level marks in the sump since the use of a small quantity of oil by the machine will lower the oil level in a short time be low the low mark, necessitating the addition of oil.

To meet this requirement, a number of different approaches have been proposed. One approach has involved providing the sump or crankcase with a shallow large-area reservoir freely communicating therewith. Although such a system is very simple, it is disadvantageous because it consumes an undue amount of space and also because it is detrimentally affected by slight changes in the inclination or level of the system.

Another approach has involved replenishing the oil supply in the sump from an auxiliary reservoir through a solenoid-controlled valve or a float-controlled valve that is controlled to operate in response to a predetermined change in the oil level in the sump. But this approach tends to be expenesive and complicated and not as reliable as might be desired in view of the presence of the valve and its control. Moreover, electric power is typically required for such a system, and there is no ability to correct an over-full condition in the event of a leak past the valve.

Still another approach is illustrated in U.S. Patent 2,081,315, Weber, where the space above the oil in an auxiliary reservoir is normally sealed at a sub-atmospheric pressure. If the oil level in the crankcase drops below a predetermined point, a vent line from the crankcase to this sealed space is uncovered, permitting air to enter this space, thus allowing oil to flow from the auxiliary reservoir into the crankcase through another line until the vent line is again covered. A disadvantage of this approach is that it can be rendered inoperative by accidental air leakage into the reduced-pressure space above the oil in the auxiliary reservoir. Also, if any oil accidentally flows into the crank case from the auxiliary reservoir, it remains there and cannot automatically be returned to the auxiliary reservoir to correct an excessively-full condition. Such a system is also sensitive to changes in atmospheric pressure and is susceptible to clogging inasmuch as line sizes and pressure differentials are small.

An object of my invention is to provide a simple and inexpensive lubrication-supply system which is capable of maintaining a substantially constant oil level in the crankcase or sump over an extended period of operation.

Another object is to provide a lubrication-supply system capable of performing as in the immediately preceding paragraph and requiring no valves, diaphragms, springs, or small orifices that could malfunction and detrimetally affect the operation of the system.

In my lubrication supply system, an auxiliary reservoir containing oil with an air space thereabove is connected to the sump through a pair of conduits. Another object is to provide a lubrication supply system of this type which is insensitive to air flow into the space above the oil in the auxiliary reservoir and which is capable of circulating oil under pressure between the sump and the auxiliary reservoir.

In carrying out my invention in one form, I provide a machine comprising an oil-containing sump into which blow-by gases escape during operation of the machine. An auxiliary reservoir also containing oil is located near the sump and is connected to the sump by first and second conduits respectively terminating at the sump in first and second ports. The second port is located at a lower level than the first port. In the machine, sealing means is provided for substantially preventing blow-by gases entering the sump from escaping from the sump while the oil level therein is above said first port, thus pressurizing the sump space above the oil level whenever the oil level is above the first port and the machine is operating. The sealing means causes the pressurized gases in the sump to lower the oil level therein sufficiently to expose the first port and permit blow-by gases to enter the first conduit. Vent means is provided for venting the space above the oil in the auxiliary reservoir to provide an escape for blow-by gases entering the auxiliary reservoir through said first conduit.

For a better understanding of the invention, reference may be had to the following description taken in conjunction with the accompanying drawing, where the single figure schematically illustrates a lubrication-supply system embodying one form of my invention.

Referring to the drawing, there is shown an air compressor 8 comprising a crankcase, or sump, 10 and a pair of spaced-apart cylinders 12 mounted thereon. In each cylinder 12 there is a piston 14 slidably mounted therein for reciprocating motion.

This reciprocating motion is transmitted to the pistons 14 through a crankshaft 16 located in the crankcase 10 and driven by a suitable motor or engine (not shown). Crankshaft 16 is coupled to pistons 14 through a plurality of connecting rods 18, each pivotally connected at its respective opposite ends to one piston 14 and to one of the cranks of the crankshaft, all in a conventional manner.

When the crankshaft is rotated, recpirocating motion is imparted to the pistons, causing each piston to draw air into its cylinder on its down-stroke and to compress this air on its up-stroke. Although each piston has the usual piston rings 15 for inhibiting the flow of compressed air past the piston, a certain amount of such air does leak by each piston. This air which leaks past the piston is commonly referred to as blow-by. It is customary to provide the crankcase (10) with a vent that freely vents this blowby to the surrounding atmosphere, but I depart from this approach, as will soon be explained.

For lubricating the compressor, a supply of oil 20 is provided in the crankcase. A quantity of oil from this supply is distributed to the various bearings and sliding surfaces of the compressor either by splash from the motion of the crank shaft or by a suitable force-feed pump (not shown). When the compressor is shut down, the level of the oil in the crankcase is typically at a position 22. But when the compressor is operated for a brief period following start-up, the oil level is depressed to a position indicated by the horizontal dotted line 24, as will soon be explained.

To enable the compressor to operate for long periods of time without requiring an operator to add oil, I provide adjacent the crankcase an auxiliary reservoir 30 containing an auxiliary oil supply 31. This auxiliary reservoir 30 is connected to the crankcase through two conduits 32 and 34. These conduits 32 and 34 terminate at the crankcase in ports 35 and 36, respectively. Port 35 is located at a higher level than port 36. Conduit 32 terminates at the auxiliary reservoir in a port 38, preferably at the top of the reservoir, and conduit 34 terminates at the auxiliary reservoir in a port 40 near the bottom of the reservoir.

The space above the oil 31 in auxiliary reservoir 30 is vented to a region at atmospheric pressure through a line 42, a conventional oil separator 44, and exhaust line 46. As will soon appear more clearly, blow-by from the crankcase is exhausted from the system via lines 38 and 42, separator 44, and exhaust line 46. Essentially all of the oil entrained in this blow-by is removed by the separator 44 and leaves the separator through an oil return line 48 that enters the auxiliary reservoir 30 below the oil level therein.

When the compressor is shut down, the level of oil in the crankcase is typically at a position 22. The crankcase space above oil level 22 is effectively sealed. Thus, when the compressor is operated for a brief period, sufficient blow-by leaks past the pistons 14 to develop a positive pressure in the effectively-sealed crankcase space above oil level 22. This pressure, acting on the upper surface of the oil in the crankcase, forces oil from the crankcase into the auxiliary reservoir 30 through both lines 32 and 34. The oil level in the crankcase continues to drop under the influence of this pressure until it reaches the dotted line position 24, at which time the upper port 35 is uncovered. When this port 35 becomes uncovered, the previously sealed crankcase space above the oil level is vented through line 32, the upper portion of auxiliary reservoir 30, line 42, separator 44, and exhaust line 46. This venting reduces the pressure in the crankcase, allowing the oil level to rise slightly to almost cover the port 35 again, thus causing the crankcase pressure to again build up and force the oil level downward slightly. This process is repeated over and over again, with the net result being that the oil level generally stabilizes at approximately the dotted-line position 24 during compressor operation.

The oil displaced from the crankcase by the blow-by gases in the above-described manner enters the auxiliary reservoir 30 and causes the level therein to rise from the solid line position to the dotted line position.

As the compressor uses oil, the oil supply in the crankcase is replenished by oil from the auxiliary reservoir 30, which flows into the crankcase through conduit 34. This oil flowing into the crankcase maintains the oil level at approximately the dotted-line position 24.

It will be apparent that my oil supply system is a very simple one inasmuch as it requires no valves, small orifices, diaphragms, or springs. The conduits 32 and 34 can be kept free of restrictions and can be made as large as desired to minimize any chance of their becoming clogged by foreign matter and to accommodate any reasonable blow-by.

My system automatically assures that there will not be an excessive supply of oil in the crankcase during compressor operation since the blow-by gases are always available to maintain the oil level at approximately the dotted-line position 24 during compressor operation. Any excess oil that might be in the crankcase prior to compressor operation is quickly and automatically forced out of the crankcase, as above described, by the pressurized blow-by gases driving the oil through lines 32 and 34 into auxiliary reservoir 30.

It will be apparent that my system does not depend for its operability upon any vacuum being maintained above the oil 31 in the auxiliary reservoir. Thus, air leakage into or out of this space will not detrimentally affect the desired operation of the system. Although I have shown this space above the auxiliary oil supply being vented through the separator directly to atmosphere, I may if desired connect line 46 to the compressor intake (not shown) so that the exhaust from line 46 will be drawn into the compressor with the normal intake from the surounding atmosphere.

Another advantage of my system is that it provides for circulation of the oil. In this regard, when the compressor is shut down, oil fram the auxiliary reservoir flows into the crankcase, and when the compressor is restarted, oil flows out of the crankcase into the auxiliary reservoir, as above-described. Even during compressor operation, the gas pressure on the oil in crankcase 10 and the flow of blow-by gases through line 32 constantly forces a small quantity of oil through conduit 32 into the auxiliary reservoir. An amount of oil substantially equal to this incoming oil flows from the auxiliary reservoir into the crankcase to maintain the oil level in the auxiliary reservoir and the crankcase in substantially the same horizontal plane. This oil circulation is desirable in several respects. First, it helps cool the oil, and, second, it assures more complete utilization of the various property-improving additives in the oil. The start-up oversupply of oil serves the desirable function of reducing the possibility of scuffing during this normally marginal lubrication period.

My system can be easily refilled by pouring oil into the auxiliary reservoir through a suitable normally-closed opening (not shown) at the top of the auxiliary reservoir. This can be done even when the machine is operating, and the oil level in the reservoir can be checked with a suitable dipstick (not shown) inserted into the opening.

Although I have shown the invention applied to a reciprocating-piston type machine, it can also be applied to other types of machines in which blow-by gases escape past a seal into the lubrication sump.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. In a machine comprising a sump into which blow-by gases escape during operation of the machine, oil within said sump, and means for maintaining a generally constant oil level in said sump during operation of said machine following a start-up period, comprising:

(a) an auxiliary reservoir containing oil and located near said sump case, (b) a first conduit interconnecting said reservoir and said sump and terminating at said sump in a first port, (c) a second conduit interconnecting said reservoir and said sump and terminating at said sump in a second port located at a lower level than said first port, (d) sealing means for substantially preventing blow-by gases entering said sump from escaping from said sump while the oil level in said sump is above said first port, thereby pressurizing the sump space above said oil level whenever the oil level is above said first port and the machine is operating, (e) said sealing means causing the pressurized gases in said sump to lower the oil level in said sump sufficiently to expose said first port and permit blow-by gases to enter said first conduit, (f) and vent means for venting the space above the oil in said auxiliary reservoir to provide an escape for blow-by gases entering said auxiliary reservoir through said first conduit.

2. The system of claim 1 in combination with oil separating means connected in the vent means from said auxiliary reservoir for separating oil from the blow-by gases passing therethrough, and means for returning said separated oil to the oil supply in said system.

3. The system of claim 1 in which said first conduit terminates at said auxiliary reservoir in an exhaust port located above the oil level in said auxiliary reservoir.

4. The system of claim 1 in which the vent means leads to a region at substantially atmospheric pressure.

5. The system of claim 1 in which:

(a) said machine is a reciprocating-piston type machine comprising a piston past which said blow-by gases escape and (b) said sump is the crankcase of the machine.

References Cited

UNITED STATES PATENTS

| | | | |
|---|---|---|---|
| 1,317,961 | 10/1919 | Conwell | 184—103 |
| 1,322,919 | 11/1919 | Maire | 184—103 |
| 2,081,315 | 5/1937 | Weber | 184—103 |
| 2,207,527 | 7/1940 | Weber | 184—103 |

HALL C. COE, Primary Examiner

U.S. Cl. X.R.

184—6